United States Patent
Vogelsang (10) Patent No.: US 6,701,234 B1
(45) Date of Patent: Mar. 2, 2004

(54) PORTABLE MOTION RECORDING DEVICE FOR MOTOR VEHICLES

(76) Inventor: Andrew John Vogelsang, 3119 N. Quincy St., Arlington, VA (US) 22207

( * ) Notice: Subject to any disclaimer, the term of this patent is extended or adjusted under 35 U.S.C. 154(b) by 0 days.

(21) Appl. No.: 09/978,538

(22) Filed: Oct. 18, 2001

(51) Int. Cl.⁷ .................. G06F 13/00; G06F 7/00
(52) U.S. Cl. .................. 701/35; 340/439; 340/441
(58) Field of Search .................. 701/1, 35, 36, 701/29; 340/438, 439, 441; 369/21

(56) References Cited

U.S. PATENT DOCUMENTS

| | | | | |
|---|---|---|---|---|
| 4,843,578 A | * | 6/1989 | Wade | 702/142 |
| 5,303,163 A | * | 4/1994 | Ebaugh et al. | 700/274 |
| 5,381,155 A | | 1/1995 | Gerber | 342/104 |
| 5,394,136 A | * | 2/1995 | Lammers et al. | 340/439 |
| 5,499,182 A | | 3/1996 | Ousborne | 364/424.01 |
| 5,510,793 A | | 4/1996 | Gregg, III et al. | 342/40 |
| 5,570,087 A | | 10/1996 | Lemelson | 340/870.05 |
| 5,745,864 A | | 4/1998 | Hosoe et al. | 701/35 |
| 5,758,299 A | | 5/1998 | Sandborg et al. | 701/29 |
| 5,805,079 A | | 9/1998 | Lemelson | 340/870.05 |
| 5,815,092 A | | 9/1998 | Gregg, III et al. | 340/936 |
| 5,857,159 A | | 1/1999 | Dickrell et al. | 701/35 |
| 5,862,500 A | | 1/1999 | Goodwin | 701/35 |
| 5,890,092 A | * | 3/1999 | Kato et al. | 701/216 |
| 5,892,434 A | | 4/1999 | Carlson et al. | 340/438 |
| 5,954,617 A | * | 9/1999 | Horgan et al. | 477/107 |
| 6,006,148 A | | 12/1999 | Strong | 701/33 |
| 6,064,970 A | * | 5/2000 | McMillan et al. | 705/4 |
| 6,073,062 A | | 6/2000 | Hoshino et al. | 701/3 |
| 6,088,636 A | | 7/2000 | Chigumira et al. | 701/26 |
| 6,111,498 A | | 8/2000 | Jobes, I et al. | 340/438 |
| 6,134,489 A | | 10/2000 | Smedley | 701/35 |
| 6,141,610 A | | 10/2000 | Rothert et al. | 701/35 |
| 6,240,773 B1 | * | 6/2001 | Rita et al. | 73/118.1 |
| 6,265,989 B1 | * | 7/2001 | Taylor | 340/901 |
| 6,271,751 B1 | * | 8/2001 | Hunt et al. | 340/514 |
| 6,305,197 B1 | * | 10/2001 | Ling | 70/30 |
| 6,430,488 B1 | * | 8/2002 | Goldman et al. | 701/36 |

FOREIGN PATENT DOCUMENTS

| | | |
|---|---|---|
| EP | DE 40 22 312 A1 | 1/1992 |
| EP | DE 41 03 599 A1 | 8/1992 |
| EP | 0 542 421 A2 | 5/1993 |
| JP | 6-34396 | 2/1994 |
| JP | 6-174498 | 6/1994 |
| JP | 6-180951 | 6/1994 |

* cited by examiner

Primary Examiner—Michael J. Zanelli
(74) Attorney, Agent, or Firm—Blank Rome LLP (57) ABSTRACT

A system and method are disclosed for monitoring motor vehicle movement parameters, such as speed, location and acceleration, for assessing the driving habits of inexperienced drivers and rewarding good driving habits or punishing poor driving habits in order to reduce speed-related driving accidents. The system includes a hand-held, self-contained, portable device capable of being securely mounted to or locked on or within a motor vehicle and capable of sensing the instantaneous speed of the vehicle using a Global Positioning System (GPS), accelerometer, or both. The GPS location data along with elapsed time information may be used to calculate the speed and acceleration of the vehicle. Alternatively, separate acceleration and speed detecting devices may be used such as transducers. The system is operated by a parent or guardian of the driver or a commercial, governmental or private monitoring service. The method of operating the invention includes mounting the device, collecting vehicle monitoring data, comparing the data to pre-established standards and awarding a prize or administering a punishment.

19 Claims, 4 Drawing Sheets

PORTABLE MOTION RECORDING DEVICE FOR MOTOR VEHICLES

BACKGROUND OF THE INVENTION

1. Field of Invention

The invention relates to the field of automated electronic monitoring of a vehicle's movement. Specifically, the invention involves an improved system and method for monitoring the speed, location and acceleration of an automobile or other motor vehicle in order to both determine the driving habits of inexperienced drivers and to reward good driving habits.

2. Description of the Prior Art

The present invention was developed primarily in response to the high incidence of speed-related accidents involving teenagers and young adults and the need to monitor their driving habits. Crash rates are high for young drivers due primarily to the driver's immaturity and lack of driving experience. According to government statistics, teenagers account for 10-percent of the U.S. population (1999) but 14-percent of motor vehicle deaths. The risk of death from vehicle accidents is highest for 16–17 year olds. Statistically, a majority of deaths occur during the weekend, Friday through Sunday, and mostly during evening hours.

Various approaches have been implemented to reduce teen driving accidents, including stiffer or graduated licensing procedures, driver education requirements and stepped-up law enforcement activities. Despite these efforts, driving accidents remain a major cause of teenage injuries. Parental involvement is arguably one of the most effective deterrents; unfortunately, parents and guardians cannot accompany driving-age children every time they drive a car to keep them from driving aggressively.

As noted in the prior art described below, vehicle monitors have been used to assess the performance of a motor vehicle and the driving habits of a vehicle's driver. Many of these systems include parametric sensors for measuring the velocity, position, acceleration, braking pressure, fuel level and other vehicle parameters; a microprocessor and data storage devices for recording data; a communications or display system for transmitting or displaying the data to the driver or to a third party; and a mechanism for attaching the system to the vehicle.

U.S. Pat. No. 5,510,793, for example, discloses a vehicle speed measuring device that uses reflected optical, ultrasonic or microwave energy and appropriate emitter and receiver technology for instantaneous speed determinations for comparison with police radar measurements. U.S. Pat. Nos. 5,570,087 and 5,805,079 disclose systems for monitoring vehicle speed, direction and location, along with instantaneous horizontal acceleration using global positioning system (GPS) circuitry and transducer technology common in the art. Still other patents, such as U.S. Pat. Nos. 5,758,299 and 5,857,159, disclose systems and methods for detecting, among other things, engine or drive shaft rotation speed, transmission shifts, throttle position, oil pressure and intake air manifold temperature by tapping into electronic signals already collected by the vehicle's on-board computer or using transducers connected to various mechanical systems on the vehicle and engine.

In addition, U.S. Pat. No. 5,892,434 discloses using mercury-filled glass tubes as inertia sensors for monitoring acceleration. European patent EP 0,542,421 A2, discloses using engine rotation speed to predict acceleration. Finally, U.S. Pat. No. 5,499,182 discloses using a vehicle's wheel and drive shaft rotation to estimate the vehicle's ground speed.

Most of the above disclosed inventions also record time associated the measurements. In some cases, parameters are not directly measured but are calculated from other measurements, as in U.S. Pat. No. 5,862,500, where average speed is calculated using distance and time data that are directly measured.

As noted above, many of the prior art patents directed to vehicle performance monitoring disclose a computer associated with the monitoring system. Generally, a computer includes a microprocessor and memory elements for receiving and relaying electronic signals from the device, performing computations, and storing and relaying vehicle performance data. U.S. Pat. No. 5,510,793, for example, discloses a computer with a memory for storing signal data. U.S. Pat. Nos. 5,570,087, 5,805,079 and 5,815,092 disclose a computer with a microprocessor for manipulating incoming signals and a memory for storing the incoming signals and processed data as data codes. U.S. Pat. Nos. 5,745,864 and 5,862,500 disclose using a data logger with electronically erasable programmable read-only memory (EEPROM) in addition to or in place of read-only memory (ROM), random access memory (RAM) or other volatile memory devices. U.S. Pat. No. 6,141,610 discloses a computer that includes a microprocessor, ROM, RAM, and other data storage devices.

In addition to the above features, several of the prior art patents described herein disclose systems that are compact, detachable and portable, allowing the devices to be removed from the motor vehicle and transported to a remote location where, for example, the data may be downloaded to a computer. U.S. Pat. Nos. 5,862,500, 6,088,636 and 6,134,489, for example, disclose devices that are compact (approximately the size of a cellular telephone or package of cigarettes) and thus easily transportable by hand. U.S. Pat. No. 5,499,182 discloses a vehicle mounting unit that also includes a coupling for receiving power from the vehicle's battery power system. DE 4,103,599 A1 discloses a monitoring device that can be locked to the vehicle so as to be removed only by authorized persons.

Other features disclosed in the prior art include an operator interface for accessing stored data. The interface may include an alphanumeric display for displaying the monitoring information; a keypad, a plurality of buttons and/or switches for entering information; plugs and/or receptacles for transferring data by wire; and other data transfer methods including wireless transmitting and receiving circuitry common in the art. Typical prior art interface devices associated with vehicle performance monitoring systems are disclosed in U.S. Pat. Nos. 5,862,500 and 6,088,636.

Much of the prior art listed above is directed primarily to performing vehicle diagnostics and assessing a driver's performance. In some cases, the information collected about the driver's performance may be used by a third party, such as an employer of a commercial driver, a rental agent that rents vehicles to the public, or a public official that monitors compliance with traffic laws. Among other uses, the third party may use the information for assessing the driver's driving habits. U.S. Pat. No. 5,381,155, for example, is directed to a speed monitoring system where the recorded data may be used by public officials to remind a driver of the vehicle's speed. U.S. Pat. No. 5,570,087 discloses a monitoring system that is used to indicate whether the driver performed hazardous driving maneuvers or deviated from a planned course of travel. U.S. Pat. No. 6,141,610 is directed to a system that allows rental car companies to monitor their rental vehicles and to determine whether a driver traveled outside a predetermined area or was involved in an accident by monitoring acceleration and deceleration. U.S. Pat. Nos. 5,499,182 and 5,758,299 disclose systems for training vehicle operators whereby driving information can be made available to a driving instructor for evaluation. Finally, EP 0,542,421 A2 discloses a method whereby the acceleration value of the vehicle is compared to a set value to determine whether the operator was complying with established driving standards.

Although many features of vehicle monitoring and driver performance systems are described in the prior art, none of the prior art patents are directed to a device specifically for use by a parent or guardian of an inexperienced driver for monitoring the driver's driving habits and rewarding good driving. There remains, therefore, the need for such a system to reduce the incidence of teenage and young adult vehicle deaths and injuries prevalent in the U.S. and around the world.

SUMMARY OF THE INVENTION

The portable speed-recording device according to the present invention provides parents and guardians with the ability to monitor their teenager's driving habits and then to respond appropriately if household driving rules are violated. This piece-of-mind is made possible by the attachment of a cellular phone-sized monitoring device that is mounted to the driver's vehicle, which contains internal electronic circuits for monitoring separately or in combination with each other, vehicle acceleration, location and speed, among other parameters, so that instantaneous vehicle speed data may be collected. The device may be attached to the driver's vehicle so that it cannot be removed without the knowledge of the device's owner thus preventing removal of the monitor. The owner may include, but is not limited to a parent, guardian, or monitoring agent.

The invention may also provide motor vehicle fleet operators with the ability to monitor other driver's driving habits and then to reward the drivers if pre-determined or established driving rules are not violated. Such fleet operators could include, but are not limited to, those who operate rental, police, fire, government and military motor vehicles. For example, a rental fleet operator may use the monitoring device to monitor rental vehicle drivers and then reward good driving habits with, for example, a discount on the rental contract price. The local police may use the monitoring device, with a parent's or guardian's permission, to collect speed-related information about an inexperienced driver's driving habits. Similarly, local, state and federal governments may use the monitoring device to monitor new employee driving habits and to reward good driving behavior or punish poor driving behavior.

The mounting device may include a lockable cable, electromagnet with electronic sensors for detecting if the monitor has been removed, or other mounting apparatus. A keypad and display, or other interface, may be used by the device's operator to set a specific time period for the device to begin and end collecting monitoring data. The internally-powered system can record relative speed maximums and the times that the maximums were attained over a specified time period. Signals are processed by a microprocessor, converted to data codes and stored in memory. The data are password protected to prevent the driver or unauthorized users from accessing the information.

Accordingly, it is a principal object of the present invention to provide a vehicle monitoring and recording system that collects, stores and displays vehicle movement data, such as velocity.

It is another object of the invention to provide a system that provides data to the system's operator, such as a parent, guardian or monitoring service agent, for assessing the driving habits of an inexperienced driver to reduce the incidence of vehicle accidents.

Still another object of the invention is to provide for a mounting device that prevents the unauthorized removal of the system by anyone other than the system's operator or detects when the system has been removed from the vehicle.

It is still another object of the invention to provide a system that is compact and easily transportable.

Still another object of the invention is to provide a system that can be mounted in a vehicle in an easily accessible location.

It is still another object of the invention to provide a system that withstands adverse weather conditions, including but not limited to, rain, ice, high humidity and extreme high or low temperatures.

Still another object of the invention to reward an inexperienced driver for good driving habits.

These and other objects and features of the present invention are accomplished by the present invention, as embodied and fully described herein, including a system mounted on or within a vehicle for monitoring the driving habits of an inexperienced driver which includes a computer for receiving, processing and outputting electronic signals; a vehicle location sensor operatively connected to the computer for detecting the instantaneous location of the vehicle and for outputting an electronic location signal corresponding to the instantaneous location; a vehicle acceleration sensor operatively connected to the computer for detecting the instantaneous acceleration of the vehicle and for outputting an electronic acceleration signal corresponding to the instantaneous acceleration; a display device operatively connected to the computer for receiving and displaying the outputted signals; a data entry device operatively connected to the computer for receiving programming commands and data; and a vehicle mounting mechanism connected to the system for securely mounting the system on or within the vehicle.

Additional features of the present invention include a vehicle location sensor that is a global positioning system (GPS) receiver and a vehicle acceleration sensor that is an accelerometer. The system may also include a battery power source and is operated by a parent or legal guardian of the driver, or an agent of the parent or guardian or a commercial or private monitoring service.

Still additional features of the invention may include an electromagnet sensor for detecting whether the system has been removed from the vehicle and for outputting an electromagnet signal; a locking device with a key hole or one or more combination dials and a cable attached to the lock, the cable including a fixed end and a free end in which the free end is threaded through a hole on the lock and then connected to the lock for securely mounting the system to the vehicle.

Additionally, the invention is accomplished by a method for monitoring the driving habits of an inexperienced driver and rewarding good driving habits by electronically initiating a vehicle monitoring device, mounting the vehicle monitoring device to a vehicle, sensing instantaneous speed signals associated with the movement of the vehicle, converting the signals to data codes, comparing the data codes to data codes already stored in memory, replacing or storing the new data codes in memory in order to record the peak speed or a list of the highest speeds determined over the interval period, and rewarding the driver with a prize or punishing the driver. The above method may also include securing the vehicle monitoring device to the vehicle with a cable and lock to prevent its detachment by unauthorized persons, electronically detecting whether the vehicle monitoring device has been detached from the vehicle, and calculating speed and acceleration values corresponding to the movement of the vehicle using instantaneous location data. The prize awarded may be money, verbal remarks, additional use of the vehicle or nothing at all. The punishment may be verbal remarks, loss of vehicle use privileges or no punishment at all.

Other objects, features and advantages of the present invention will become evident to one skilled in the art from the following detailed description of the invention in conjunction with the referenced drawings.

DETAILED DESCRIPTION OF THE INVENTION

Figure 1:
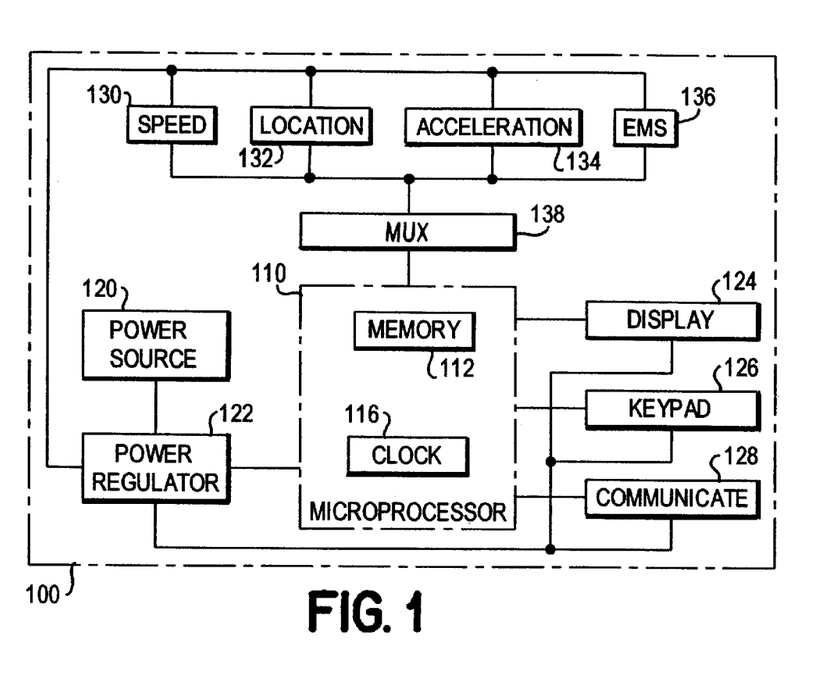
FIG. 1 is a schematic block diagram of the electrical components according to one embodiment of the present invention.

In the present invention, several preferred embodiments are described for illustrative purposes. Referring first to FIG. 1, a schematic block diagram of the electrical components of a vehicle monitoring system 100 according to the present invention are shown. The system 100 is a self-contained system that includes a microprocessor (i.e., computer) 110 which has a memory device 112 and an oscillator (clock) 116. The memory device 112 may include any type of memory common in the art, such as read-only memory (ROM), random-access memory (RAM), electronically erasable programmable read-only memory (EEPROM), flash memory or a combination of these devices, but is preferably a non-volatile memory or memory that can store data codes indefinitely with minimal or even no power supply. The memory device 112 may also include, but is not limited to, a disk drive, SmartCard, CompactFlash, memory stick, flash card, IBM Microdrive™, or optical disk. The oscillator 116 may have any frequency output that is compatible with the device and can be any type of oscillator such as a crystal oscillator.

Figure 3:
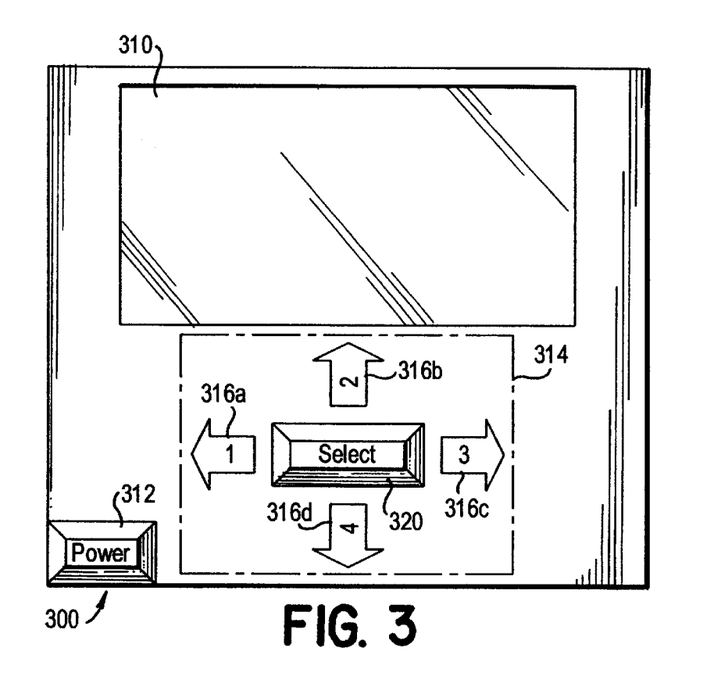
FIG. 3 is a drawing showing the display and keypad according to one embodiment of the present invention.

Also shown in FIG. 1 is a power source 120 and power regulator or conditioner 122. The power source 120 is at least one on-board battery, preferably a rechargeable battery such as nickel-cadmium (Ni—Cd), nickel metal hydride (Ni—MH) or lithium ion (Li-ion), or comparable rechargeable technology. The battery or batteries 120 may be removable, to provide for remote charging, or they may be permanently attached to the device. If permanent rechargeable batteries are used, the vehicle monitoring system 100 will include a port (not shown) for connecting the device to a standard 110-volt electrical outlet. Alternatively, power source 120 may be standard alkaline batteries or other non-rechargeable battery type. The power regulator 122 is a conditioning circuit, as needed, to ensure that the correct voltages and currents are supplied to the various electrical sensors and components of the monitoring system 100. Also shown in FIG. 1 are input/output interface devices, including a display 124, a keypad 126, and a communications port 128. The display 124 may be any display common in the art, including a liquid-crystal display (LCD) or light emitting diode (LED) and associated circuitry, so long as it is compatible with displays for alphanumeric characters and the power requirements are minimal to preserve battery life while still providing sufficient illumination for reading the display 124 under various background light levels. The keypad 126 may include keys, buttons, switches, or other methods of interfacing with the monitoring system 100 (FIG. 3). The keypad 126 includes at least one power on/off key (or button or switch) (FIG. 3).

As shown in FIG. 1, the monitoring system of the present invention uses vehicle performance sensors, including a vehicle speed detection device 130, a vehicle location detection device 132 and a vehicle acceleration detection device 134. Depending on the type of detection device being used, analog-to-digital converters and signal processing circuits (not shown) may also be required. Also, a multiplexer 138 may be used to process multiple signals from the speed detection device 130, the vehicle location detection device 132, the vehicle acceleration detection device 134 and the electromagnet sensor 136 and pass those signals to the microprocessor 110.

Figure 4:
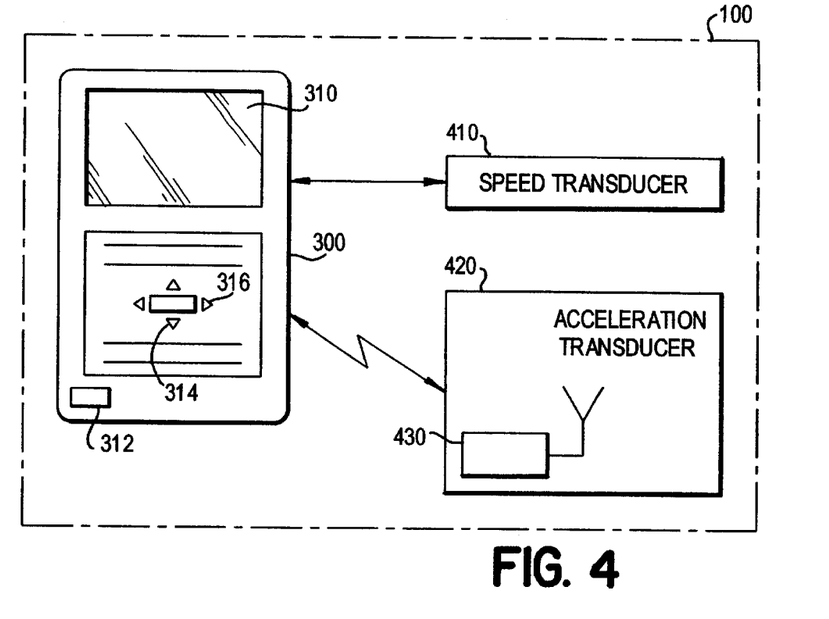
FIG. 4 is a drawing of the present invention using transducers.

The vehicle speed detection device 130 may be a GPS circuit for receiving radio signal telemetry from the GPS satellite navigation system (not shown). In this embodiment, the interface communications port 128 is a microwave radio receiver for receiving the GPS carrier signals and data. The telemetry received by the receiver 128 is interfaced with a modem (also not shown) and then stored in the memory device 112 along with a time code. The GPS signals may need to be processed to convert them to a signal suitable for processing by the microprocessor 110. Vehicle speed is indirectly measured by recording instantaneous time and distance values. Alternatively, the vehicle speed detection device 130 may be a transducer attached to the vehicle that electronically senses the vehicle's speed, such as a wheel rotation sensor or accelerometer, and sends a vehicle speed or acceleration signal to the monitoring system 100 via cable or by wireless transmitter using a wireless transmission protocol standard in the art (FIG. 4).

The vehicle location detection device 132 is preferably a GPS circuit for receiving radio signal telemetry from the GPS satellite navigation system (not shown). As noted above, GPS telemetry information would be received, processed and stored in the memory 112. It will be appreciated by one of skill in the art that the vehicle speed detection device 130 and vehicle location detection device 132 may be the same device, such as a GPS circuit that is used to determine a vehicle's speed, acceleration or location. Thus, only one device may be required.

The vehicle acceleration detection device 134 may be GPS signal receiving and processing circuitry for determining relative velocity changes over time, or an accelerometer for sensing inertia changes over time. Alternatively, the vehicle acceleration detection device 134 may be a transducer attached to the vehicle that electronically senses the vehicle's acceleration and sends an electronic vehicle acceleration signal to the monitoring system 100 via cable or by wireless transmitter using a wireless transmission protocol standard in the art (FIG. 4)

Figure 2A:
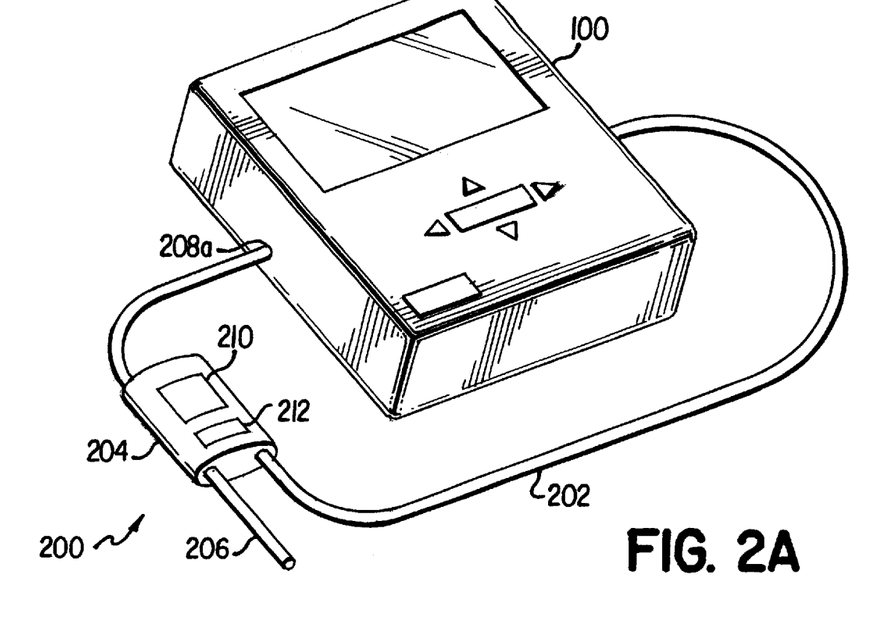
FIG. 2A is a perspective drawing of the present invention with a cable and lock mounting mechanism.

Referring now to FIG. 2A, a perspective drawing of a vehicle mounting device 200 attached to the vehicle monitoring system 100 is illustrated. In this configuration, the vehicle mounting device 200 is a cable and lock device which consists of a cable 202 that is fixed to a lock 204 on one end while the other end is slidably connected to the lock 204. This allows the cable 202 to be adjusted to various sizes to accommodate different components of the vehicle (such as an interior door handle or structural member). Once attached to the vehicle, the end of the cable 206 is pulled through the lock 204 and secured tightly, thus preventing unauthorized removal of the monitoring system 100. The cable passes through the monitoring system 100 at reinforced grommet points 208a on one side and 208b (not shown) on the other side. The lock 204 may include a key hole 210 for accepting a key or may include a combination lock 212 consisting of at least one dial ring.

Figure 2B:
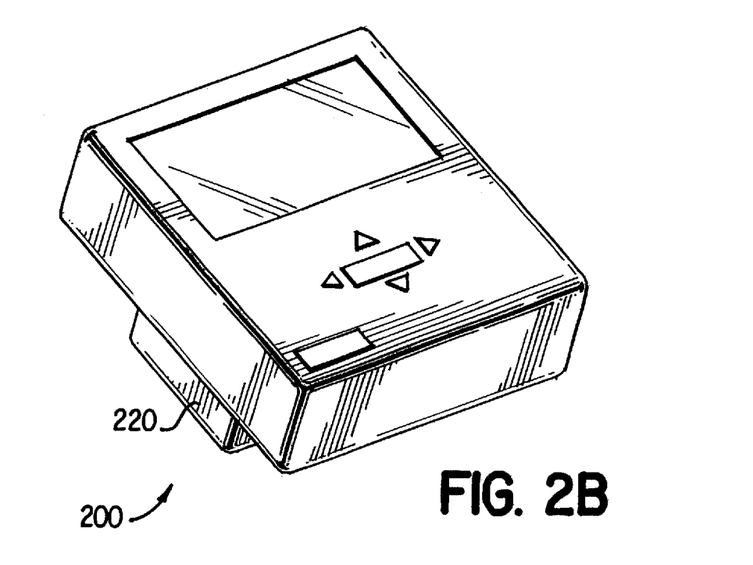
FIG. 2B is a perspective drawing of the present invention with an electromagnetic mounting mechanism.

Now referring to FIG. 2B, an alternative vehicle mounting device 200 attached to the vehicle monitoring system 100 is shown. In this embodiment, the vehicle mounting device 200 is an electromagnet 220 for attaching the monitoring system 100 to the vehicle. An electromagnet sensor 136 (FIG. 1) detects whether the magnet has been detached from the vehicle, sending a signal to the microprocessor 110.

Referring now to FIG. 3, the user interface 300 is shown. The interface 300 includes a display 310, a power switch/button 312 and an input keypad 314. The keypad 314 may be arranged as shown or located on one of the sides or top or bottom faces of the monitoring system 100. The keypad 314 will preferably consist of at least one "select" or "enter" button for sending commands to the microprocessor 110 and one or more toggle or cursor keys 316 for selecting input characters (i.e., letters and numerals) and for navigating through the displayed text.

Referring now to FIG. 4, a drawing of the present invention using transducers is shown. As described above, the vehicle speed detection device 130 may include a speed transducer 410 attached to the vehicle that electronically senses the vehicle's speed. The speed transducer 410 sends a vehicle speed signal to the microprocessor 110 via a wire or, in the alternative, by using a wireless transmitter and wireless transmission protocol standard in the art. In the embodiment shown in FIG. 4, the speed transducer 410 is shown connected to the microprocessor 110 using a wire.

Similarly, the vehicle acceleration detection device 134 may include an acceleration transducer 420, as previously described. In FIG. 4, the acceleration transducer 420 is shown with a transmitter 430 for sending an electronic vehicle acceleration signal to the communications port 128. It will be appreciated by one of skill in the art that the acceleration transducer 420 could also be connected to the microprocessor 110 directly by a wire.

Figure 5:
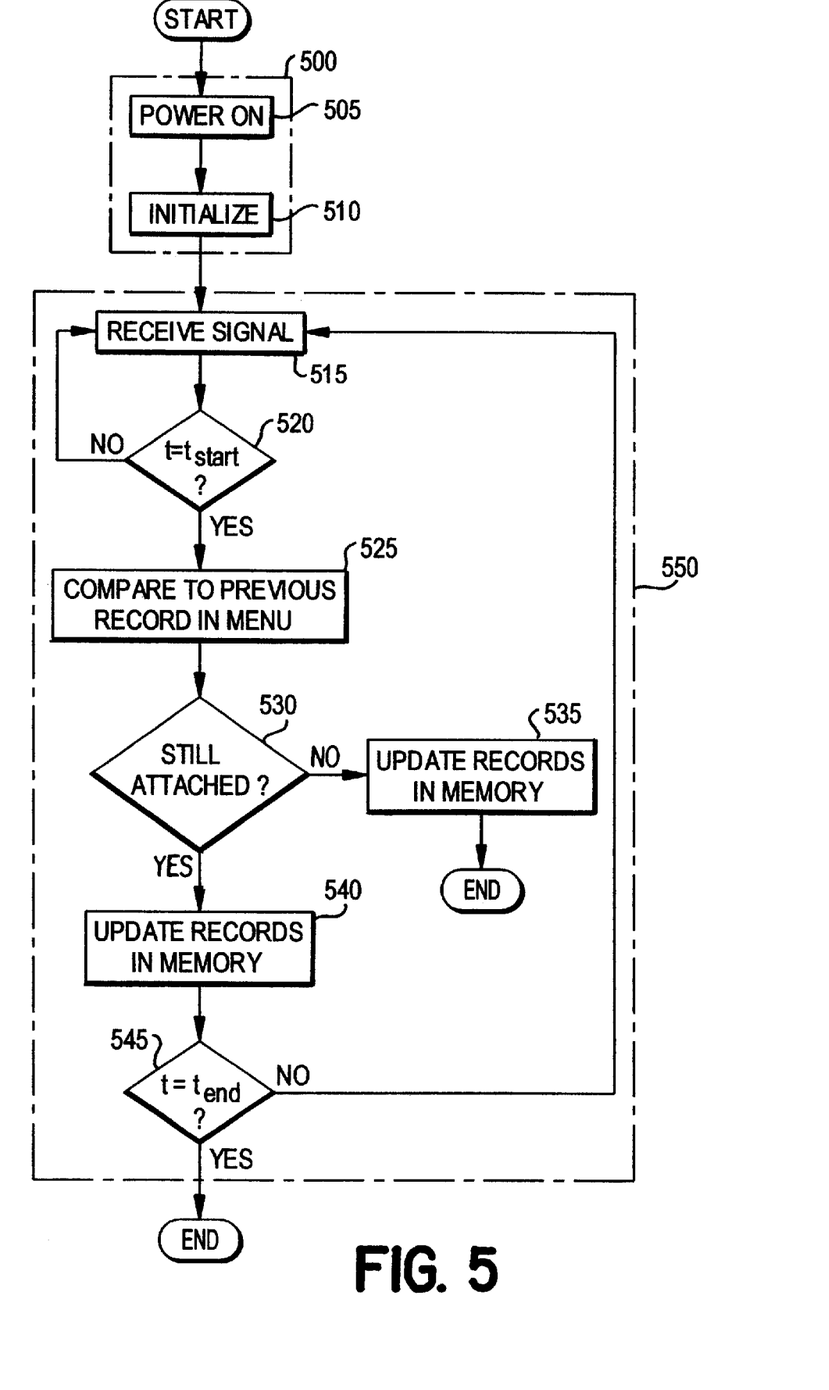
FIG. 5 is a block flow diagram of the software of the present invention.

Referring now to FIG. 5, a block flow diagram of the software according to the present invention is show. The system initialization process 500 includes turning the power on 505 and initializing the system 510. The initialization step 510 includes automatically resetting the counters, initializing the parameters associated with configuring the communications port 128 and the modem (not shown), detecting a GPS signal (if a GPS is included), and beginning the clock function. The system accepts operator inputs at initialization step 510, such as password, time of day, start and stop time, duration of monitoring, minimum speed to be recorded and allows the operator to clear the system memory 112, change the password, review data stored in the memory 112 and exit the initialization process 500.

The main processing loop 550 begins after the initialization process 500 is complete. First, signals from the various sensors or monitoring devices, such as the speed detection device 130, the vehicle location detection device 132, the vehicle acceleration detection device 134 and the electromagnet sensor 136 are received at step 515.

Next, at decision step 520, the clock time t is compared to the start time $t_{start}$ entered by the system operator. If the clock time t has not reached the start time $t_{start}$ the processing loop continues to receive signals at step 515 and to compare the clock time t to the start time $t_{start}$.

Next, at process step 525, the most recent speed, location and/or acceleration signals are processed (converted to data codes) and the new data are compared to the records stored in the memory 112 (which, initially are all zero). If the new data are larger than the records in the memory 112, the monitoring system 100 prepares to update the records in the memory 112 with the new records.

Then, at decision step 530, the signal from the electromagnetic sensor 136 is used to determine if the monitoring system 100 has been detached from the motor vehicle. If so, the memory records are updated with the latest speed, location, acceleration and time of day data, the electromagnetic sensor record is flagged and the monitoring system 100 stops recording. If the signal from the electromagnetic sensor 136 indicates the monitoring system 100 has not been detached, the updated records determined at process step 525 are stored in the memory 112. Thus, only the peak speed and acceleration values are stored in the memory 112. However, the monitoring system 100 may also be employed to record a certain number of peak speed and acceleration values and their corresponding time of day records so that the system operator can review a rank ordered list of speed-related data values. The location and electromagnetic sensor status records are continuously updated.

Next, at decision step 545, the clock time t is compared to the stop time $t_{stop}$ entered by the system operator. If the clock time t exceeds the stop time $t_{stop}$ the monitoring system 100 stops receiving signals and the main processing loop 550 ends. If the clock time t does not exceed the stop time $t_{stop}$ then the processing loop begins again at step 515 and continues to record signals.

In an alternative embodiment that includes the cable and lock mounting device 200, the process steps 530 and 535 are eliminated and the process step 515 does not include receiving a signal from the electromagnetic sensor 136.

Figure 6:
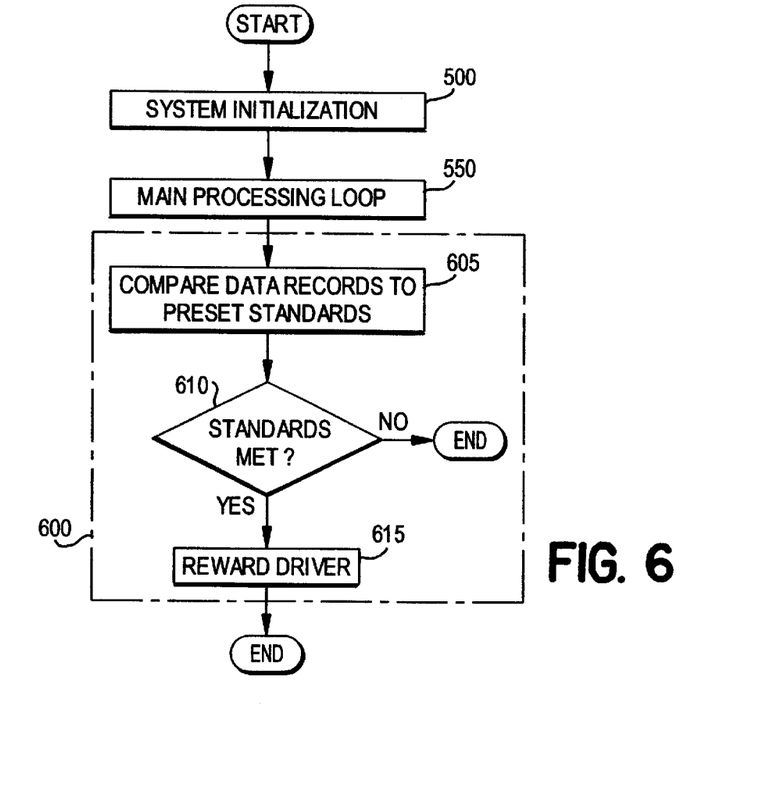
FIG. 6 is another block flow diagram of the software of the present invention.

Now referring to FIG. 6, another block flow diagram according to the present invention is shown. The system initialization process 500 and the main processing loop 550 are executed as previously described. A reward or punishment process 600 is executed at the completion of the main processing loop 550. First, at process step 605, the system operator reviews the data collected and recorded in the process steps 535 and 540. During the process step 605, the system operator compares the data values in the memory 112 to a pre-established standard; for example, the peak instantaneous speed or the top five peak speed values are compared to a pre-established maximum speed standard. During process step 605, the system operator may also request an explanation from the driver to justify the peak recorded speeds if they appear excessive.

At decision step 610, the system operator determines whether the recorded values have exceeded the pre-established standard values and, if the values meet or exceed the standard, then the inexperienced driver is rewarded at process step 615. If the values do not meet or exceed the standard, a reward is withheld (i.e., the process ends) or, alternatively, a punishment is administered. The reward may be any incentive reward, including, but not limited to, a prize, verbal remarks, a promotion, additional use of the vehicle, reduced monitoring frequency, additional or enhanced non-motor vehicle related privileges, money or no prize at all. The punishment may be any punishment including, but not limited to, verbal remarks, a demotion, restricted use of the vehicle, increased monitoring frequency, payment of money, or no punishment at all. The operator may, for example, be a parent, guardian, agent of a parent or guardian, commercial or private monitoring service.

Although this invention has been described in connection with specific embodiments, objects and purposes for the invention, it will be appreciated by one of skill in the art that various modifications of the invention, other than those discussed above, may be resorted to without departing from the nature and scope of the invention.

What is claimed is:

1. A system for use by a motor vehicle owner or operator for monitoring the driving habits of an inexperienced driver comprising:
   a self-contained, portable monitoring apparatus comprising:
      a computer for processing electronic signals;
      a vehicle speed sensor operatively connected to said computer for detecting the instantaneous speed of a vehicle and for outputting an electronic speed signal corresponding to said instantaneous speed;
      a display operatively connected to said computer for receiving and displaying said processed electronic signals from said computer; and
      a data entry device operatively connected to said computer for receiving programming commands and data,
   wherein a reward or punishment is administered by the motor vehicle owner or operator to the driver upon viewing said displayed electronic signals.

2. The system of claim 1, wherein said vehicle speed sensor is a global positioning system receiver.

3. The system of claim 1, wherein said vehicle speed sensor is an accelerometer.

4. The system of claim 1, further comprising a battery power source.

5. The system of claim 1, further comprising a vehicle mounting device connected to the system for securely locking the system to the vehicle and for preventing its removal by the driver or unauthorized person.

6. A system for use by a motor vehicle owner or operator for monitoring the driving habits of an inexperienced driver comprising:
   a monitoring device comprising:
      a computer for processing electronic signals;
      a vehicle location sensor operatively connected to said computer for detecting the instantaneous location of a vehicle and for outputting an electronic location signal corresponding to said instantaneous location, wherein the vehicle location sensor is a global positioning system receiver;
      a vehicle acceleration sensor operatively connected to said computer for detecting the instantaneous acceleration of the vehicle and for outputting an electronic acceleration signal corresponding to said instantaneous acceleration, wherein said vehicle acceleration sensor is an accelerometer;
      a display device operatively connected to said computer for receiving and displaying said processed electronic signals from said computer;
      a data entry device operatively connected to said computer for receiving programming commands and data; and
      a vehicle mounting device connected to the system for securely locking the system to the vehicle and for preventing its removal by the driver or unauthorized person,
   wherein a reward or a punishment is administered by the vehicle owner or operator to the driver upon viewing said displayed electronic signals.

7. The system of claim 6, wherein said vehicle mounting device comprises:
   an electromagnet; and
   an electromagnetic sensor,
   wherein said electromagnet and electromagnetic sensor are used for detecting whether the system has been removed from the vehicle and for outputting an electronic signal.

8. The system of claim 6, wherein said vehicle mounting device comprises:
   a lock, wherein said lock has one of a key hole and one or more combination dials; and
   a cable attached to said lock, said cable including a fixed end and a free end and wherein said free end is threaded through a hole on the system and then connected to said lock for securely mounting the system to the vehicle.

9. A method for use by a vehicle owner or operator for monitoring the driving habits of an inexperienced driver and rewarding good driving habits comprising the steps of:
   mounting a self-contained, portable vehicle monitoring device to a vehicle, wherein said self-contained, portable vehicle monitoring device includes a display;
   sensing instantaneous speed signals associated with the movement of the vehicle;
   comparing said speed signals against pre-established standards;
   displaying said speed signals to the vehicle owner or operator; and
   rewarding the driver with a prize or administering a punishment if said movement of the vehicle deviates from said pre-established standards.

10. The method of claim 9, further comprising the steps of:
   calculating peak speed and acceleration values corresponding to the movement of said vehicle using said instantaneous speed signals; and
   comparing said calculated values against pre-established standards.

11. The method of claim 10, further comprising the steps of:
   electronically initiating said vehicle monitoring device;
   converting said signals and calculated values to data codes;

comparing said data codes to data codes already stored in a computer memory; and replacing data codes in memory with more recent data codes.

12. The method of claim 9, further comprising the step of securing the vehicle monitoring device to the vehicle with a cable and lock to prevent its detachment by unauthorized persons.

13. The method of claim 9, further comprising the step of securing the vehicle monitoring device to the vehicle with an electromagnet.

14. The method of claim 13, further comprising the step of detecting whether the vehicle monitoring device has been detached from the vehicle.

15. The method of claim 9, wherein said prize is money.

16. The method of claim 9, wherein said punishment is withholding use of the vehicle.

17. A system for use by a motor vehicle owner or operator for monitoring the driving habits of an inexperienced driver comprising:
   a self-contained, portable monitoring apparatus comprising:
      computer means for processing electronic signals;
      sensor means operatively connected to said computer means for detecting movement of a vehicle;
      display means operatively connected to said computer means for receiving and displaying said processed electronic signals from said computer means; and
      data entry means operatively connected to said computer means for entering programming commands,
   wherein a reward or punishment is administered by the motor vehicle owner or operator upon viewing said displayed processed electronic signals from said computer means.

18. A system for use by a parent or guardian for monitoring the driving habits of an inexperienced driver comprising:
   a self-contained, portable monitoring apparatus comprising:
      a computer for processing electronic signals;
      a vehicle speed sensor operatively connected to said computer for detecting the instantaneous speed of a vehicle and for outputting an electronic speed signal corresponding to said instantaneous speed;
      a display operatively connected to said computer for receiving and displaying said processed electronic signals from said computer; and
      a data entry device operatively connected to said computer for receiving programming commands and data,
   wherein a reward or punishment is administered by the parent or guardian of the inexperienced driver to the driver upon viewing said displayed electronic signals.

19. A system for use by a parent or guardian for monitoring the driving habits of an inexperienced driver comprising:
   a self-contained, portable monitoring apparatus comprising:
      a housing;
      a computer inside said housing for processing electronic signals;
      a vehicle speed sensor operatively connected to said computer for detecting the instantaneous speed of a vehicle and for outputting an electronic speed signal corresponding to said instantaneous speed;
      a display mounted to said housing and operatively connected to said computer for receiving and displaying said processed electronic signals from said computer; and
      a data entry device mounted to said housing and operatively connected to said computer for receiving programming commands and data;
   wherein a reward or a punishment is administered by the vehicle owner or operator to the driver upon viewing said displayed electronic signals.

* * * * *